United States Patent
Li

(10) Patent No.: US 11,621,794 B1
(45) Date of Patent: Apr. 4, 2023

(54) SYSTEMS AND METHODS FOR PROCESSING A SUBCARRIER-MULTIPLEXED SIGNAL

(71) Applicant: HUAWEI TECHNOLOGIES CO., LTD., Guangdong (CN)

(72) Inventor: Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/590,243

(22) Filed: Feb. 1, 2022

(51) Int. Cl.
| | |
|---|---|
| *H04B 10/60* | (2013.01) |
| *H04J 14/02* | (2006.01) |
| *H04B 10/61* | (2013.01) |
| *H04B 10/299* | (2013.01) |
| *H04B 10/64* | (2013.01) |

(52) U.S. Cl.
CPC ........ *H04J 14/0298* (2013.01); *H04B 10/299* (2013.01); *H04B 10/6164* (2013.01); *H04B 10/64* (2013.01); *H04B 10/60* (2013.01); *H04B 10/616* (2013.01)

(58) Field of Classification Search
CPC ............... H04J 14/0298; H04B 10/299; H04B 10/6164; H04B 10/64; H04B 10/60; H04B 10/616
USPC .................................... 398/43–103, 202–214
See application file for complete search history.

(56) References Cited

U.S. PATENT DOCUMENTS

| | | | | |
|---|---|---|---|---|
| 4,344,178 A * | 8/1982 | Waters | ................ | H04L 27/2273 455/208 |
| 5,042,052 A * | 8/1991 | Roberts | ............... | H04L 27/2273 329/307 |
| 5,533,050 A * | 7/1996 | Isard | ...................... | H04L 7/0062 375/326 |
| 7,590,168 B2 * | 9/2009 | Raghavan | ........... | H04L 27/2601 375/259 |
| 2002/0127982 A1 * | 9/2002 | Haapoja | ................. | H03D 3/009 455/314 |
| 2008/0267312 A1 * | 10/2008 | Yokoyama | ............ | H04L 5/0044 375/267 |
| 2010/0098438 A1 * | 4/2010 | Prat Goma | ............ | H04B 10/61 398/203 |
| 2010/0202775 A1 * | 8/2010 | Agazzi | ................. | H04B 10/548 398/76 |
| 2013/0183040 A1 * | 7/2013 | Elahmadi | ............ | H04L 27/3488 398/79 |
| 2015/0295747 A1 * | 10/2015 | Tanaka | ................. | H04B 10/516 375/261 |
| 2016/0197681 A1 * | 7/2016 | Sun | .................... | H04B 10/6162 398/81 |
| 2016/0204871 A1 * | 7/2016 | Li | ....................... | H04L 27/2601 398/183 |
| 2016/0323040 A1 * | 11/2016 | Wood | ................... | H04B 10/614 |
| 2018/0091288 A1 * | 3/2018 | Zamani | .............. | H04B 10/6166 |
| 2020/0235842 A1 * | 7/2020 | Jia | ........................... | H04J 14/06 |

(Continued)

*Primary Examiner* — Dibson J Sanchez
(74) *Attorney, Agent, or Firm* — BCF LLP

(57) ABSTRACT

The disclosed systems and methods for processing a subcarrier-multiplexed signal comprising: i) mixing the subcarrier-multiplexed signal with a local oscillator (LO) signal; ii) extracting a respective subcarrier signal from the subcarrier-multiplexed signal; iii) sampling the respective subcarrier signal; iv) extracting timing recovery information from the respective subcarrier signal; and v) processing the respective sampled subcarrier signal to extract data from the respective sampled subcarrier signal.

18 Claims, 6 Drawing Sheets

(56) References Cited

U.S. PATENT DOCUMENTS

2020/0252154 A1\* 8/2020 Wu .................. H04J 14/02
2020/0336285 A1\* 10/2020 Sun .................. H04B 10/61

\* cited by examiner

023
SYSTEMS AND METHODS FOR PROCESSING A SUBCARRIER-MULTIPLEXED SIGNAL

CROSS-REFERENCE TO RELATED APPLICATIONS

This is the first application filed for the instantly disclosed technology.

TECHNICAL FIELD

The present disclosure generally relates to optical communications and, in particular, to systems and methods for processing a subcarrier-multiplexed signal.

BACKGROUND

Digital Sub-Carrier Multiplexing (DSCM) is a digital signal processing (DSP) technique that was considered for simple DSP algorithm and found to be more robust to nonlinearities that inevitably occur in optical communication systems. In DSCM, the received signal having a high bandwidth is demultiplexed digitally and processed by the DSP modules.

The processing of such high bandwidth signals have certain issues. In particular, DSP modules that process the high bandwidth signals require ultrahigh speed time-interleaved analog to digital convertors (TI-ADCs) for sampling. The ultrahigh speed TI-ADCs highly depend on complementary metal-oxide-semiconductor (CMOS) technology. The TI-ADCs used in these scenarios are very sensitive to jitters, which further exacerbate the performance of the TI-ADCs with increased operating speeds.

Further, the DSP modules processing the high bandwidth signals also require complicated timing recovery and phase lock loop (PLL) (both digital and analog) in order to maintain specific jitter requirements. Additionally, power reduction for lower baud rates is limited as speed of the TI-ADCs cannot be adjusted freely. Also, dispersion compensation cannot be reduced significantly because of the large size of Fast Fourier Transform module (FFT) required before performing digital subcarrier demultiplexing.

To this end, there is an interest in developing a simple and efficient system and method for processing high bandwidth received signals that include multiplexed subcarrier signals.

SUMMARY

The embodiments of the present disclosure have been developed based on developers' appreciation of the limitations associated with the prior art, namely that processing the high bandwidth signals requires ultrahigh speed time-interleaved analog to digital convertors (TI-ADCs) for sampling. Additionally, processing the high bandwidth signals requires complicated timing recovery and phase lock loop (PLL) (both digital and analog) in order to maintain specific jitter requirements.

Developers of the present technology have devised methods for processing high bandwidth received signals that include multiplexed subcarrier signals that are less sensitive to jitter which is a dominating factor that limits performance of high-speed ADCs.

In accordance with a first broad aspect of the present disclosure, there is provided a system for processing a subcarrier-multiplexed signal comprising: a plurality of processors, each one of the plurality of processors comprising: at least one mixer configured to mix the subcarrier-multiplexed signal with a local oscillator (LO) signal generated by a LO; at least one filter configured to extract a respective subcarrier signal from the subcarrier-multiplexed signal; at least one analog-to-digital converter (ADC) configured to sample the respective subcarrier signal; a timing recovery module configured to extract timing recovery information from the respective subcarrier signal; and each one of the plurality of processors is configured to process the respective sampled subcarrier signal to extract data from the respective sampled subcarrier signal In accordance with any embodiments of the present disclosure, the system further comprises a subcarrier data aligner configured to align the data in different subcarrier signals included in the subcarrier-multiplexed signal.

In accordance with any embodiments of the present disclosure, the at least one filter is further configured to extract at least two subcarrier signals from the subcarrier-multiplexed signal; the at least one ADC is further configured to sample the at least two subcarrier signals; and each one of the plurality of processors is configured to process the at least two sampled subcarrier signals to extract data from the at least two sampled subcarrier signals In accordance with any embodiments of the present disclosure, the system further comprises an integrated coherent receiver (ICR) configured to receive the subcarrier-multiplexed signal.

In accordance with any embodiments of the present disclosure, the received subcarrier-multiplexed signal is an optical signal and the ICR is further configured to convert the optical signal to an electrical signal.

In accordance with any embodiments of the present disclosure, the received subcarrier-multiplexed signal is a wireless signal and the ICR is further configured to convert the wireless signal to an electrical signal.

In accordance with any embodiments of the present disclosure, the subcarrier-multiplexed signal is oversampled by a transmitter.

In accordance with any embodiments of the present disclosure, the subcarrier-multiplexed signal includes a plurality of subcarrier signals multiplexed together to form the subcarrier-multiplexed signal.

In accordance with any embodiments of the present disclosure, the system further comprises a LO controller configured to control the LO to generate the LO signal in accordance with the timing recovery information.

In accordance with a second broad aspect of the present disclosure, there is provided a method for processing a subcarrier-multiplexed signal comprising: mixing the subcarrier-multiplexed signal with a local oscillator (LO) signal; extracting a respective subcarrier signal from the subcarrier-multiplexed signal; sampling the respective subcarrier signal; extracting timing recovery information from the respective subcarrier signal; and processing the respective sampled subcarrier signal to extract data from the respective sampled subcarrier signal.

In accordance with any embodiments of the present disclosure, the method further comprises aligning the data in different subcarrier signals included in the subcarrier-multiplexed signal.

In accordance with any embodiments of the present disclosure, the method further comprises extracting at least two subcarrier signals from the subcarrier-multiplexed signal; sampling the at least two subcarrier signals; and processing the at least two sampled subcarrier signals to extract data from the at least two sampled subcarrier signals.

In accordance with any embodiments of the present disclosure, the method further comprises receiving the subcarrier-multiplexed signal.

In accordance with any embodiments of the present disclosure, the received subcarrier-multiplexed signal is an optical signal.

In accordance with any embodiments of the present disclosure, the method further comprises converting the optical signal to an electrical signal.

In accordance with any embodiments of the present disclosure, the received subcarrier-multiplexed signal is a wireless signal.

In accordance with any embodiments of the present disclosure, the method further comprises converting the wireless signal to an electrical signal.

In accordance with any embodiments of the present disclosure, the subcarrier-multiplexed signal is oversampled by a transmitter.

In accordance with any embodiments of the present disclosure, the subcarrier-multiplexed signal includes a plurality of subcarrier signals multiplexed together to form the subcarrier-multiplexed signal.

In accordance with any embodiments of the present disclosure, the method further comprises controlling a LO to generate the LO signal in accordance with the timing recovery information.

BRIEF DESCRIPTION OF THE FIGURES

Further features and advantages of the present disclosure will become apparent from the following detailed description, taken in combination with the appended drawings, in which.

Figure 1:
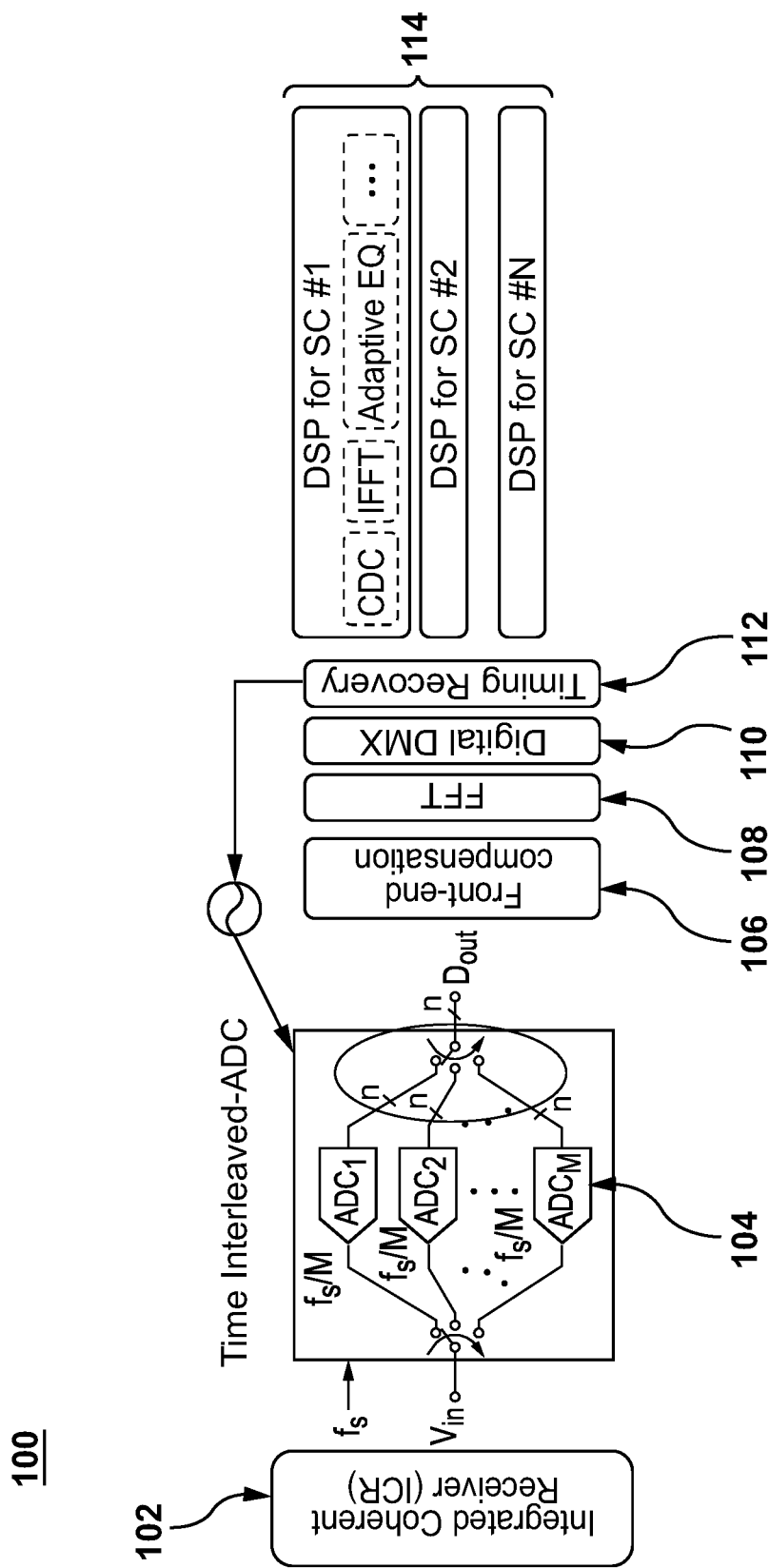
FIG. 1 (Prior Art) illustrates a typical system of digital sub-carrier multiplexing (DSCM) based on time-interleaved analog to digital convertors (TI-ADCs)

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for processing a subcarrier-multiplexed signal.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware such as processors, controllers, memory elements or a combination thereof that is expressly or implicitly shown.

With these fundamentals in place, the instant disclosure is directed to address at least some of the deficiencies of the current technology. In particular, the instant disclosure describes a system and a method for processing a subcarrier-multiplexed signal.

FIG. 1 (Prior Art) illustrates a typical system 100 of digital sub-carrier multiplexing (DSCM) based on time-interleaved analog to digital convertors (TI-ADCs). The typical system 100 includes an integrated coherent receiver (ICR) 102, a plurality of TI-ADCs 104 with defined sampling rate, a front-end compensation module 106, a Fast Fourier transformation (FFT) module 108, a digital demultiplexer 110, a timing recovery module 112, and a plurality of processors 114.

The ICR 102 receives high bandwidth optical signals and converts the high bandwidth optical signals to the corresponding electrical signals. The TI-ADCs 104 may sample the electrical signals in an interleaved manner. The TI-ADCs 104 include a set of sub-ADCs which sample the electrical signal from the ICR at a slower sampling rate, an output rotating switch to serialize the output of the TI-ADCs 104. The TI-ADCs 104 have an internal DSP algorithm to adjust phase and amplitude of each sub-ADC to generate sampling signal at full speed.

The serialized output from the TI-ADCs 104 is forwarded to the front-end compensation module 106 to compensate for any distortion introduced at the ICR. The compensated serialized output is converted to a frequency domain signal by the FFT module 108. The digital demultiplexer 110 demultiplexes the frequency domain signal to N subcarriers. The timing recovery module 112 recovers timing information from the N subcarriers. The timing information is provided to the TI-ADCs 104 to keep optimum sampling frequency and phase. The plurality of processors 114 process the N subcarriers to extract the associated data.

It is to be noted that, the typical system 100 has certain drawbacks and limitations. In particular, as the baud rate of the high bandwidth optical signals increases (and correspondingly, the sampling rate), the signal quality becomes very sensitive to jitter and the performance of the timing recovery module 112.

Also, the optical signal may experience dispersion in which the dispersion has long fading length, thereby requiring a large-sized FFT module 108. The fading length (measured in number of symbols) increases dramatically as the baud rate increases. The DSP design based on this requirement requires advanced CMOS technology in order to keep power and size acceptable.

Further, when a lower baud rate is preferred, some of the sub-ADCs are still required to run at full speed resulting in more power consumption than required.

Figure 2:
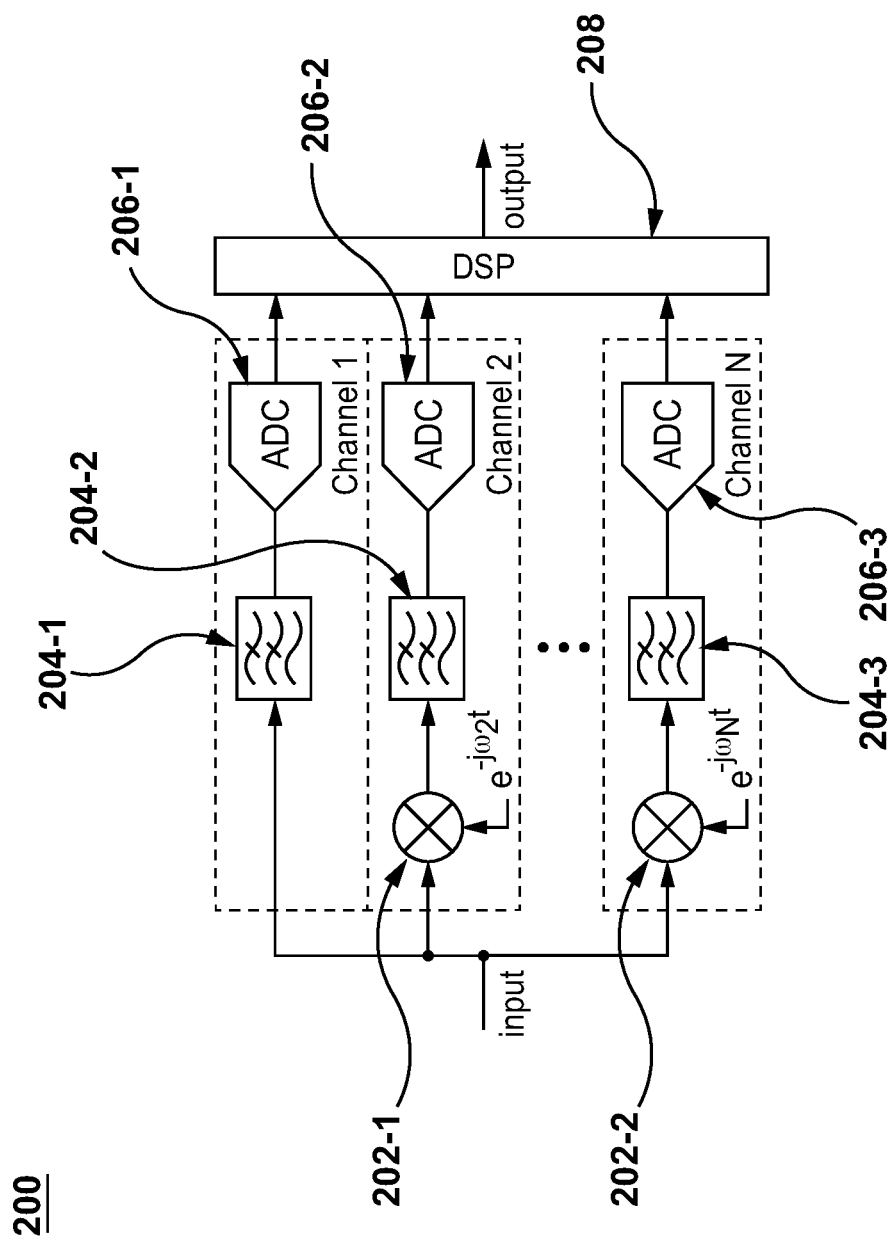
FIG. 2 (Prior Art) illustrates typical frequency interleaved-analog to digital convertors (FI-ADCs)

FIG. 2 (Prior Art) illustrates typical frequency interleaved-analog to digital convertors (FI-ADCs) 200. The typical FI-ADCs 200 include a plurality of local oscillators (LOs) 202-1, 202-2 and so on, a plurality of filters 204-1, 204-2, 204-3, and so on, a plurality of sub-ADCs 206-1, 206-2, 206-3 and so on having a lower sampling rate, and a processor 208.

The typical FI-ADCs 200 are different from the typical TI-ADCs 104 in a manner that each of the plurality of sub-ADCs 206-1, 206-2, 206-3 samples a portion of the electrical signal in a different frequency bin. The output of the plurality of sub-ADCs 206-1, 206-2, 206-3 are combined in the processor 208 to generate full-band signal.

Compared to the typical TI-ADCs 104, the typical FI-ADC 200 may require additional hardware, such as, for example, a plurality of LOs 202-1, 202-2 and plurality of filters 204-1, 204-2, 204-3. Though the typical TI-ADCs 104 may require wires (delay-line) and phase lock loop (PLLs), the typical TI-ADCs 104 are generally simpler compared with the FI-ADCs 200. For this reason, the typical system 100 with the typical TI-ADCs 104 is more common in current optical communications. However, the typical FI-ADCs 200 are much less sensitive to jitter which is a dominating factor that limits performance of high-speed ADCs. Also, the typical FI-ADCs 200 are less dependent on CMOS technology.

With this said, there is an interest in developing an efficient system that provides benefits of the typical FI-ADCs 200 with reduced hardware complexity and capability to process high bandwidth signals that contain multiple subcarrier signals with improved performance.

Figure 3:
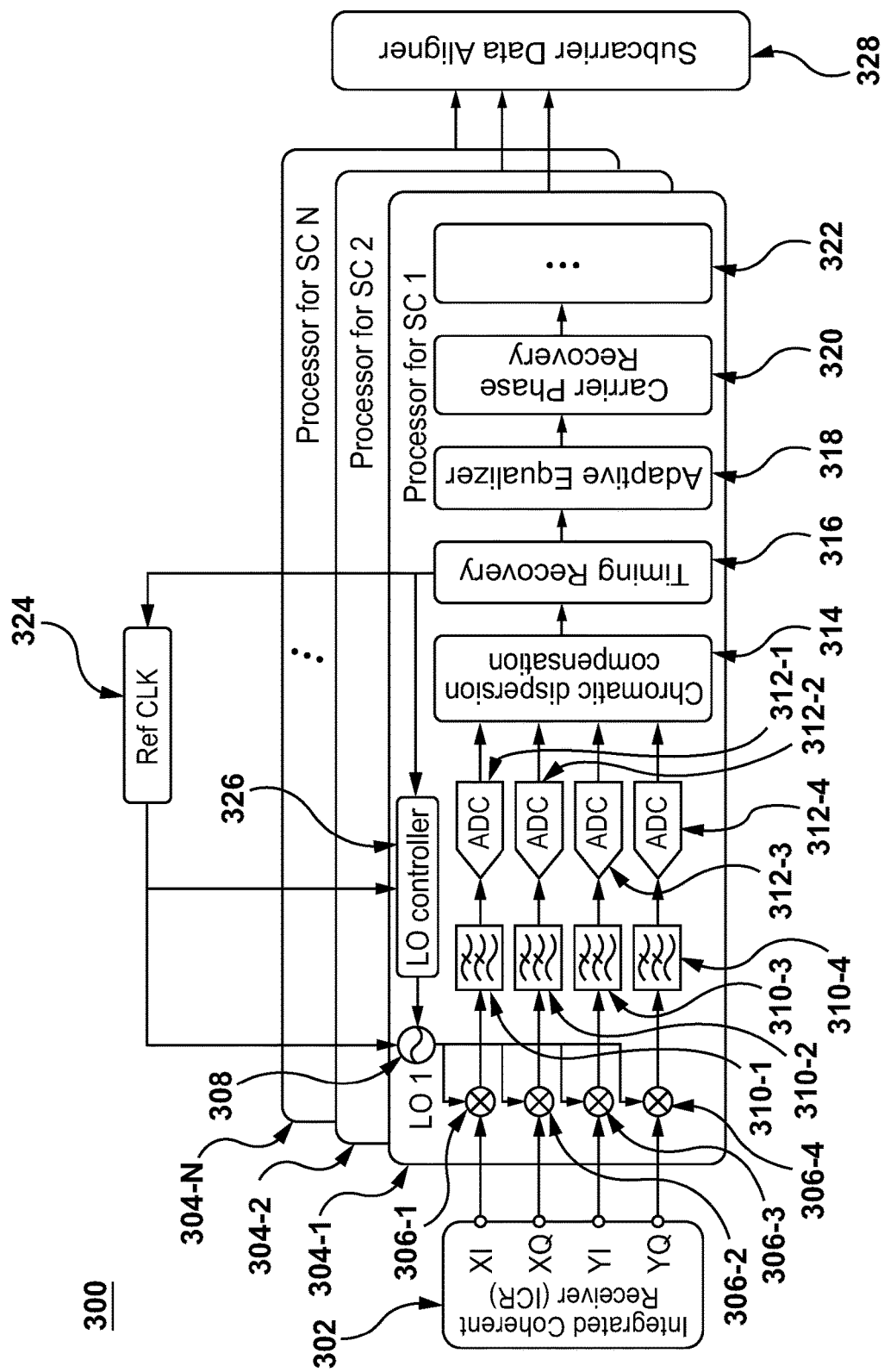
FIG. 3 illustrates a system for processing subcarrier multiplexed signals, in accordance with various non-limiting embodiments.

FIG. 3 illustrates a system 300 for processing subcarrier multiplexed signals, in accordance with various non-limiting embodiments of the instant disclosure. As shown, system 300 may include an integrated coherent receiver (ICR) 302, a plurality of processors 304-1, 304-2 . . . 304-N, a reference clock (CLK) module 324, a LO controller 326 and a subcarrier data aligner 328.

Each one of the plurality of processors 304-1, 304-2 . . . 304-N may include a plurality of mixers 306-1, 306-2, 306-3, 306-4, a local oscillator 308, a plurality of filters 310-1, 310-2, 310-3, and 310-4, a plurality of ADC 312-1, 312-2, 312-3, 312-4, a chromatic dispersion compensation (CDC) module 314, a timing recovery module 316, an adaptive equalizer 318, a carrier phase recovery module 320, a post processing module 322 to implement other algorithms such as, for example, correcting algorithm and forward error correcting (FEC) algorithm. Each one of the plurality of processors 304-1, 304-2 . . . 304-N may have the same components as discussed above, and for the purpose of simplicity, the functionality of the processor 304-1 will be discussed in further detail below. It is contemplated that system 300 may include additional components, however, such components have been omitted from FIG. 3 for the purpose of simplicity.

It is to be noted that various modules such as for example, the reference CLK module 324, the CDC module 314, the timing recovery module 316, the adaptive equalizer 318, the carrier phase recovery module 320, and the post processing module 322 discussed in the present disclosure may be implemented on each one of the plurality of processors 304-1, 304-2 . . . 304-N. In certain non-limiting embodiments, various modules listed above may be implemented as software. In certain non-limiting embodiments, various modules listed above may be implemented as hardware. How the modules have been implemented should not limit the scope of the present disclosure. In certain non-limiting embodiments, each one of the plurality of processors 304-1, 304-2 . . . 304-N may include non-transitory memory elements that may store instructions to be implemented by the plurality of processors 304-1, 304-2 . . . 304-N.

In certain non-limiting embodiments, the ICR 302 may receive a subcarrier-multiplexed signal. The subcarrier-multiplexed signal may include multiple data signals modulated over subcarrier frequencies and multiplexed together to form the subcarrier-multiplexed signal.

In certain non-limiting embodiments, the subcarrier-multiplexed signal may be a wireless signal transmitted by wirelessly by a transmitter (not illustrated). The ICR 302 may convert the subcarrier-multiplexed signal into electrical signals and forward the electrical signals to the plurality of processors 304-1, 304-2 . . . 304-N. In certain other non-limiting embodiments, the subcarrier-multiplexed signal may be an optical signal transmitted by a transmitter (not illustrated) over an optical fiber network. The subcarrier-multiplexed signal may have in-phase and quadrature components. The ICR 302 may convert the subcarrier-multiplexed signal into electrical signals and forward the electrical signals to the plurality of processors 304-1, 304-2 . . . 304-N.

Each one of the plurality of processors 304-1, 304-2 . . . 304-N may extract and process a respective subcarrier in the subcarrier-multiplexed signal. By way of example, if the subcarrier-multiplexed signal has N subcarriers, the processor 304-1 may be process the subcarrier-multiplexed signal to extract first subcarrier, the processor 304-2 may process the subcarrier-multiplexed signal to extract second subcarrier, the processor 304-3 may process the subcarrier-multiplexed signal to extract third subcarrier and so on.

For simplicity and tractability, the following description is directed to extracting and processing one subcarrier in the subcarrier-multiplexed signal by the processor 304-1 with the understanding that the remaining processors 304-2, 304-3 and 304-4 may perform similar functionalities and operations on other subcarriers.

With this said, the plurality of mixers 306-1, 306-2, 306-3, 306-4 may receive the electrical signals corresponding to the in-phase and quadrature components. The plurality of mixers 306-1, 306-2, 306-3, 306-4 may mix the electrical signals corresponding to the in-phase and quadrature components with a local oscillator (LO) signal generated by the LO 308. It is to be noted that the subcarrier-multiplexed signal may not include the in-phase and quadrature components and in such scenarios, a single mixer may be used in place of the plurality of mixers 306-1, 306-2, 306-3, and 306-4.

The LO 308 may be locked to a reference CLK provided by the reference CLK module 324. The LO signal generated by the LO 308 may assist the plurality of filters 310-1, 310-2, 310-3, and 310-4 to extract a subcarrier from the subcarrier-multiplexed signal. It is to be noted that in each of the plurality of processors 304-1, 304-2 . . . 304-N LOs may be tuned to different frequencies to extract respective subcarriers and process the respective subcarriers to extract the included data.

In certain non-limiting embodiments, each of the plurality of processors 304-1, 304-2 . . . 304-N may be synchronized to the reference CLK. A frequency of the reference CLK may be controlled by the reference CLK module 324 in accordance with a timing recovery information extracted by the timing recovery module 316. There might be a phase and frequency difference between LOs of each of the plurality of processors 304-1, 304-2 . . . 304-N, to this end, the LO controller 326 may adjust the LO 308 in accordance with timing recovery information from the respective subcarrier signal and the reference CLK.

The plurality of filters 310-1, 310-2, 310-3, and 310-4 may extract the respective subcarrier signal from the subcarrier-multiplexed signal. In certain non-limiting embodiments, the plurality of filters 310-1, 310-2, 310-3, and 310-4 may have cutoff frequencies in accordance with the respective subcarrier signal. As previously discussed, the subcarrier-multiplexed signal may not include the in-phase and quadrature components. In such scenarios, a single filter may be used in place of the plurality of filters 310-1, 310-2, 310-3, and 310-4.

The plurality of filters 310-1, 310-2, 310-3, and 310-4 may forward the in-phase and quadrature components of the respective subcarrier signal to the plurality of ADC 312-1, 312-2, 312-3, 312-4. The plurality of ADC 312-1, 312-2, 312-3, 312-4 may sample the in-phase and quadrature components of the respective subcarrier signal. As noted above, there may be some scenarios where the subcarrier-multiplexed signal may not include the in-phase and quadrature components. In such scenarios, a single ADC may be used in place of the plurality of ADC 312-1, 312-2, 312-3, 312-4.

Once the in-phase and quadrature components of the respective subcarrier signal are sampled, the remaining modules of the processor 304-1 such as the CDC module 314, the timing recovery module 316, the adaptive equalizer 318, the carrier phase recovery module 320, and the post processing module 322 may process the respective sampled subcarrier signal to extract the included data.

The CDC module 314 may compensate for any chromatic dispersion in the respective sampled subcarrier signal. The timing recovery module may extract a timing recovery information from the respective sampled subcarrier signal. The timing recovery module may forward the timing recovery information to the reference CLK module 324 and the LO controller 326. The adaptive equalizer 318 may perform equalization on the respective sampled subcarrier signal. The carrier phase recovery module 320 may extract phase of the subcarrier signal and the post processing module 322 may correct remaining distortion in the respective subcarrier signal.

Figure 4:
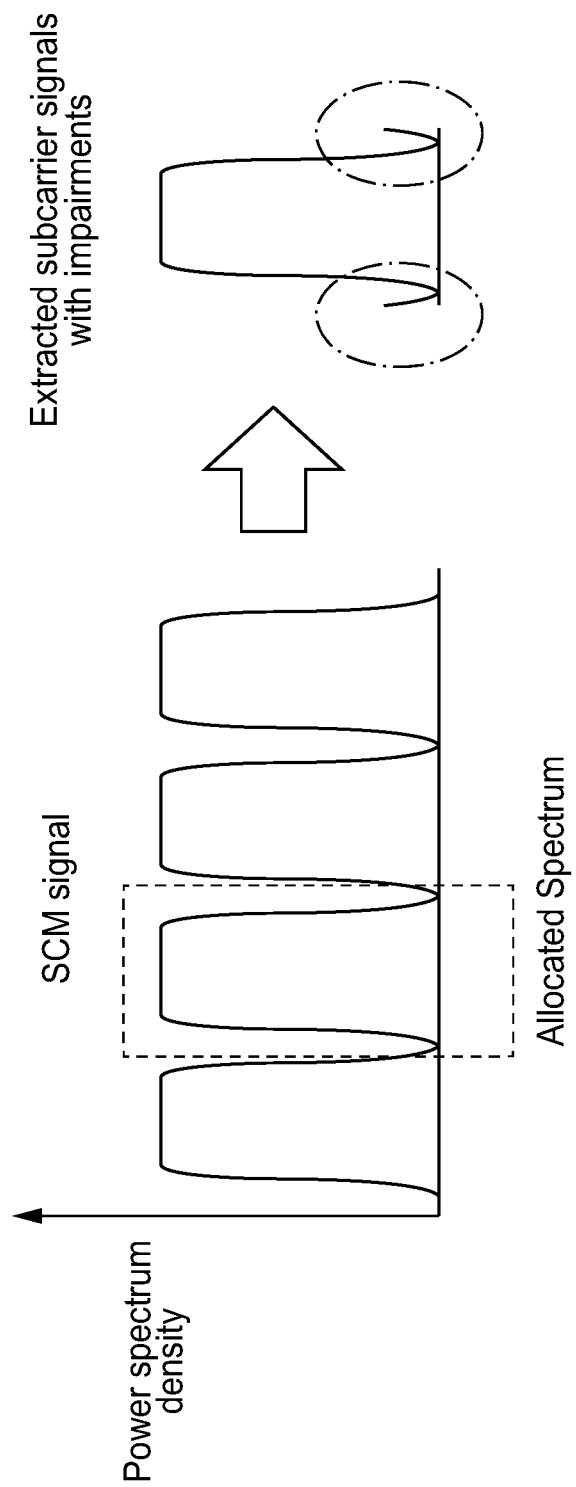
FIG. 4 illustrates the extracted respective subcarriers signal with impairments.

It is to be noted that due to limited analog filtering capacity of the plurality of filters 310-1, 310-2, 310-3, and 310-4, there are chances of aliasing from the adjacent subcarrier signals. FIG. 4 illustrates the extracted respective subcarrier signal with impairments. As shown, the extracted respective subcarrier signal may get corrupted by the adjacent subcarrier signals. To reduce the effect of aliasing, in certain non-limiting embodiments, each subcarrier signal may be over-sampled by the transmitter (not illustrated). The extra frequency content may be removed by digital filters (not illustrated) in the processor 304-1. The joint design of analog and digital filter may further relax hardware requirements while keeping minimum impact on performance.

Additionally, a residual phase difference between the subcarriers may result in data offset in the time domain. To compensate for the effect of the residual phase difference, in certain non-limiting embodiments, the system 300 may include the subcarrier data aligner 328. The subcarrier data aligner 328 may align/synchronize the data in different subcarrier signals included in the subcarrier-multiplexed signal. The data alignment/synchronization may be performed in data rate with all impairments (such as due to aliasing or any other impairment) being removed. To this end, the complexity of the subcarrier data aligner 328 may be reduced. How the subcarrier data aligner 328 aligns the data should not limit the scope of present disclosure.

Figure 5:
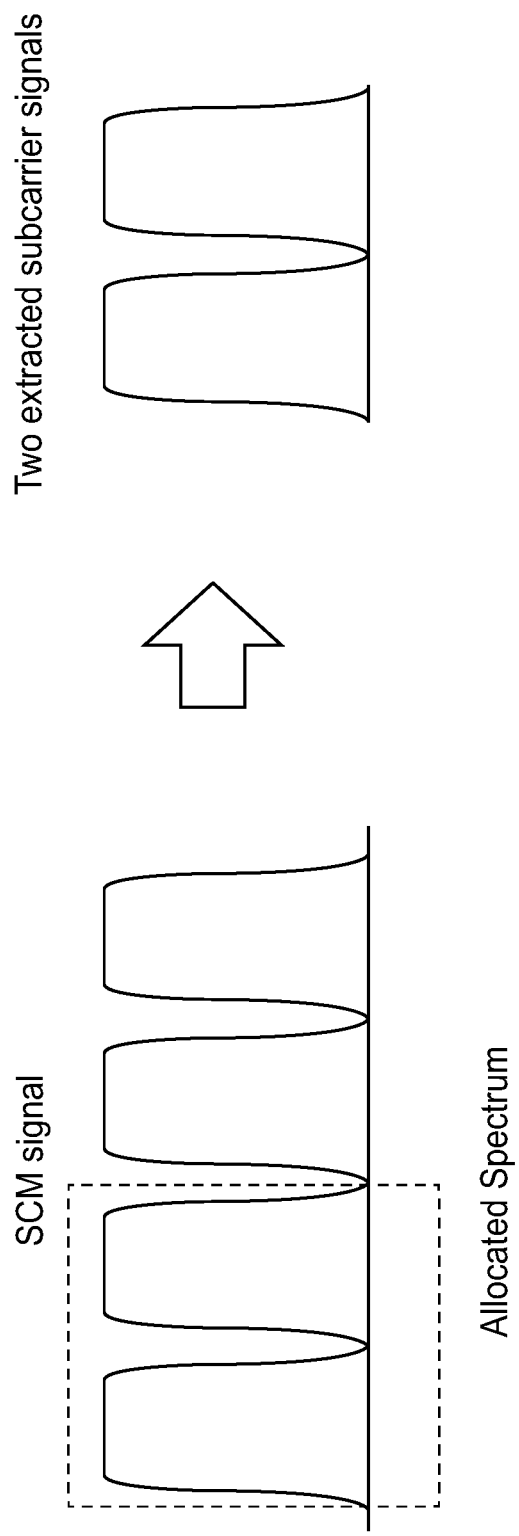
FIG. 5 illustrates the two extracted subcarrier signals, in accordance with various non-limiting embodiments of the present disclosure.
Figure 6:
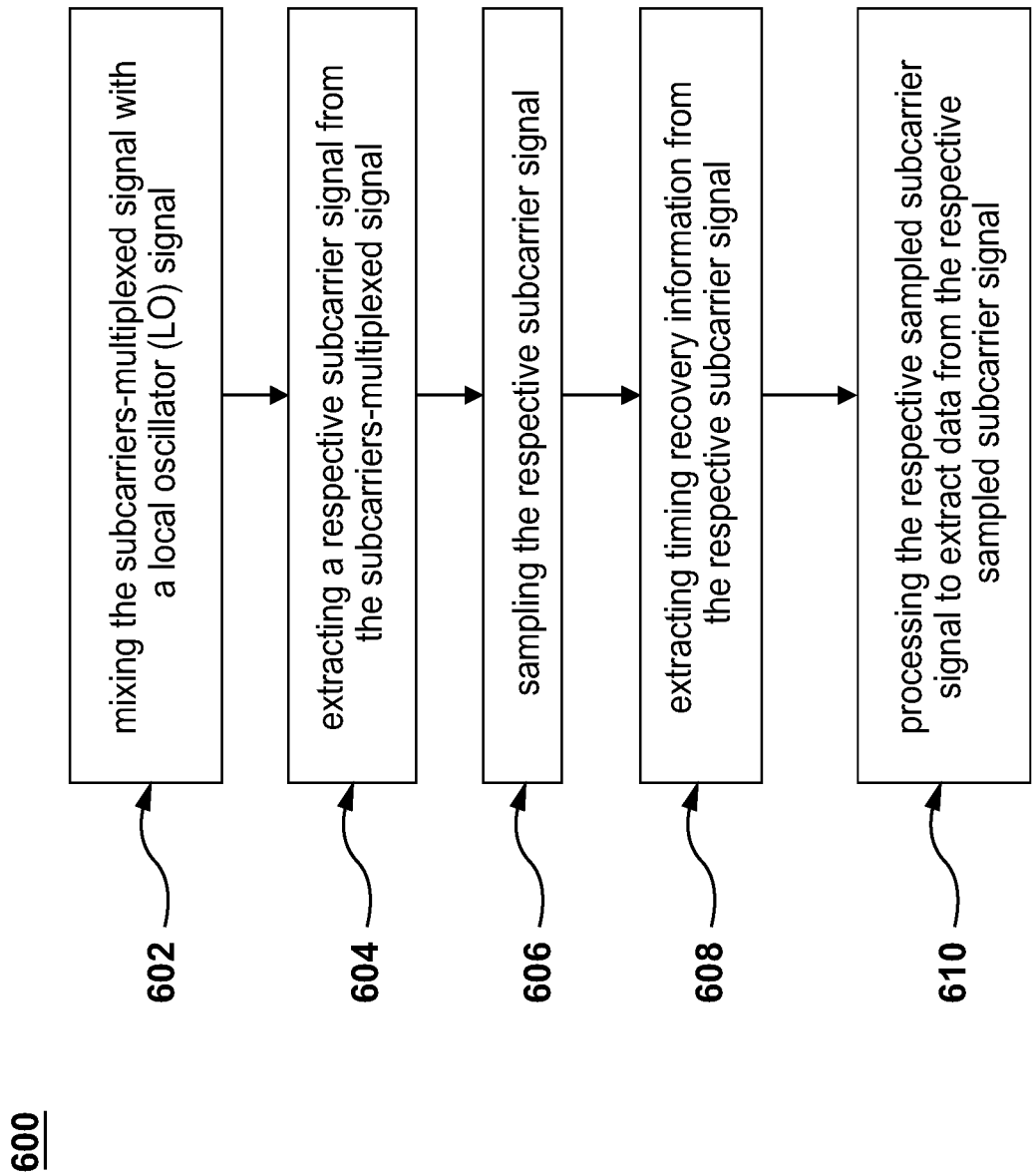
FIG. 6 depicts a flowchart of a process representing a method for processing a subcarrier-multiplexed signal in accordance with various non-limiting embodiments of the present disclosure.

To further reduce the hardware complexity, in certain non-limiting embodiments, the plurality of filters 310-1, 310-2, 310-3, and 310-4 may extract at least two subcarrier signals from the subcarrier-multiplexed signal. FIG. 5 illustrates the two extracted subcarrier signals, in accordance with various non-limiting embodiments of the present disclosure. The plurality of ADC 312-1, 312-2, 312-3, 312-4 may sample the at least two subcarriers and the processor 304-1 may process the at least two sampled subcarrier signals to extract data from the at least two sampled subcarrier signals. Thereby, offering more flexibility in terms of design trade off FIG. 6 depicts a flowchart of a process 600 representing a method for processing a subcarrier-multiplexed signal in accordance with various non-limiting embodiments of the present disclosure. The process 600 commences at step 602, where at least one mixer configured to mix the subcarrier-multiplexed signal with a local oscillator (LO) signal generated by a LO. As previously noted, at least one of the plurality of mixers 306-1, 306-2, 306-3, 306-4 may mix the subcarrier-multiplexed signal with the LO signal generated by the LO 308.

The process 600 advances to step 604, where at least one filter extracts a respective subcarrier signal from the subcarrier-multiplexed signal. As previously discussed, at least one filter of the plurality of filters 310-1, 310-2, 310-3, and 310-4 may extract the respective subcarrier signal from the subcarrier-multiplexed signal.

The process 600 proceeds to step 606, where at least one analog-to-digital converter (ADC) samples the respective subcarrier signal. As noted previously, at least one of the plurality of ADC 312-1, 312-2, 312-3, 312-4 may sample the respective subcarrier signal.

The process advances to step 608, where a timing recovery module extracts timing recovery information from the respective subcarrier signal. As noted above, the timing recovery module 316 extracts timing recovery information from the respective subcarrier signal.

Finally, at step 610 a processor is configured to process the respective sampled subcarrier signal to extract data from the respective sampled subcarrier signal. As previously discussed, each one of the plurality of processors 304-1, 304-2 . . . 304-N processes the respective sampled subcarrier signal to extract data from the respective sampled subcarrier signal.

It is to be understood that the operations and functionality of the system 300, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A system for processing a subcarrier-multiplexed signal comprising:
 a plurality of processors, each one of the plurality of processors comprising:
  at least one mixer configured to mix the subcarrier-multiplexed signal with a local oscillator (LO) signal generated by a LO;
  at least one filter configured to extract a respective subcarrier signal from the subcarrier-multiplexed signal;
  at least one analog-to-digital converter (ADC) configured to sample the respective subcarrier signal;
  a timing recovery module configured to extract timing recovery information from the respective subcarrier signal;
  a reference clock module configured to provide a reference clock in accordance with the timing recovery information; and
  a LO controller configured to control the LO to generate the LO signal in accordance with the timing recovery information and the reference clock;
 wherein each one of the plurality of processors is configured to process the respective sampled subcarrier signal to extract data from the respective sampled subcarrier signal in accordance with the LO signal.

2. The system of claim 1 further comprising a subcarrier data aligner configured to align the data in different subcarrier signals included in the subcarrier-multiplexed signal.

3. The system of claim 1, wherein:
the at least one filter is further configured to extract at least two subcarrier signals from the subcarrier-multiplexed signal;
the at least one ADC is further configured to sample the at least two sub carrier signals; and
each one of the plurality of processors is configured to process the at least two sampled subcarrier signals to extract data from the at least two sampled subcarrier signals.

4. The system of claim 1 further comprising an integrated coherent receiver (ICR) configured to receive the subcarrier-multiplexed signal.

5. The system of claim 4, wherein the received subcarrier-multiplexed signal is an optical signal and the ICR is further configured to convert the optical signal to an electrical signal.

6. The system of claim 4, wherein the received subcarrier-multiplexed signal is a wireless signal and the ICR is further configured to convert the wireless signal to an electrical signal.

7. The system of claim 1, wherein the subcarrier-multiplexed signal is oversampled by a transmitter.

8. The system of claim 1, wherein the subcarrier-multiplexed signal includes a plurality of subcarrier signals multiplexed together to form the subcarrier-multiplexed signal.

9. A method for processing a subcarrier-multiplexed signal comprising:
mixing the subcarrier-multiplexed signal with a local oscillator (LO) signal;
extracting a respective subcarrier signal from the subcarrier-multiplexed signal;
sampling the respective subcarrier signal;
extracting timing recovery information from the respective subcarrier signal;
providing a reference clock in accordance with the timing recovery information;
generating the LO signal in accordance with the timing recovery information and the reference clock; and
processing the respective sampled subcarrier signal to extract data from the respective sampled subcarrier signal in accordance with the LO signal.

10. The method of claim 9 further comprising aligning the data in different subcarrier signals included in the subcarrier-multiplexed signal.

11. The method of claim 10, further comprising:
extracting at least two subcarrier signals from the subcarrier-multiplexed signal;
sampling the at least two subcarrier signals; and
processing the at least two sampled subcarrier signals to extract data from the at least two sampled subcarrier signals.

12. The method of claim 9 further comprising receiving the subcarrier-multiplexed signal.

13. The method of claim 12, wherein the received subcarrier-multiplexed signal is an optical signal.

14. The method of claim 13 further comprising converting the optical signal to an electrical signal.

15. The system of claim 12, wherein the received subcarrier-multiplexed signal is a wireless signal.

16. The method of claim 15 further comprising converting the wireless signal to an electrical signal.

17. The method of claim 9, wherein the subcarrier-multiplexed signal is oversampled by a transmitter.

18. The method of claim 9, wherein the subcarrier-multiplexed signal includes a plurality of subcarrier signals multiplexed together to form the subcarrier-multiplexed signal.

* * * * *